(12) United States Patent
Brinkley et al.

(10) Patent No.: US 7,970,410 B2
(45) Date of Patent: Jun. 28, 2011

(54) METHOD AND APPARATUS FOR REMOTE INITIATION OF ARINC 615 DOWNLOADS

(75) Inventors: Roger R. Brinkley, Woodinville, WA (US); Timothy M. Mitchell, Seattle, WA (US); Jerry L. Price, Sammamish, WA (US); David R. Lee, Renton, WA (US)

(73) Assignee: The Boeing Company, Chicago, IL (US)

( * ) Notice: Subject to any disclaimer, the term of this patent is extended or adjusted under 35 U.S.C. 154(b) by 1323 days.

(21) Appl. No.: 11/520,093

(22) Filed: Sep. 13, 2006
(Under 37 CFR 1.47)

(65) Prior Publication Data

US 2009/0077265 A1    Mar. 19, 2009

Related U.S. Application Data

(63) Continuation of application No. 10/075,032, filed on Feb. 12, 2002, now abandoned.

(60) Provisional application No. 60/268,085, filed on Feb. 13, 2001.

(51) Int. Cl.
*H04W 74/00* (2009.01)
(52) U.S. Cl. ......... 455/455; 455/73; 455/98; 455/412.1; 455/419; 701/2; 701/3; 342/36
(58) Field of Classification Search .................. 455/431, 455/66.1, 67.13, 73, 98, 412.1, 414.1, 419, 455/899; 701/2, 3, 14, 120; 342/29, 33, 342/36
See application file for complete search history.

(56) References Cited

U.S. PATENT DOCUMENTS

| | | |
|---|---|---|
| 3,573,740 A | 4/1971 | Berger et al. |
| 5,077,671 A | 12/1991 | Leslie et al. |
| 5,079,707 A | 1/1992 | Bird et al. |
| 5,307,505 A | 4/1994 | Houlberg et al. |
| 5,410,478 A | 4/1995 | Richard et al. |
| 5,424,949 A | 6/1995 | Applegate et al. |
| 5,428,650 A | 6/1995 | Pitot |
| 5,761,625 A | 6/1998 | Honcik et al. |
| 5,805,828 A | 9/1998 | Lee et al. |

(Continued)

FOREIGN PATENT DOCUMENTS
EP   0774724   8/2000
(Continued)

OTHER PUBLICATIONS

Airlines Electronic Engineering Committee: "ARINC—network server system: ARINC Characteristic 763-2," 20011121, pp. 1-79, Nov. 21, 2001, XP002988393.

*Primary Examiner* — Matthew D Anderson
*Assistant Examiner* — Shaima Q Aminzay
(74) *Attorney, Agent, or Firm* — Harness, Dickey & Pierce, P.L.C.

(57) ABSTRACT

A method and apparatus for remotely downloading data from a selected one of a plurality of avionics line replaceable units (LRUs) on an aircraft. In one configuration, a method includes transmitting a message wirelessly to a receiver on the aircraft identifying an LRU having data to be downloaded; selectively switching a communication path from the identified LRU to an aircraft data services link (ADSL) dependent upon the identified LRU; and wirelessly downloading data from the identified LRU utilizing the selectively switched communication path.

19 Claims, 3 Drawing Sheets

U.S. PATENT DOCUMENTS

| | | | |
|---|---|---|---|
| 5,841,969 A | 11/1998 | Fye | |
| 5,970,395 A * | 10/1999 | Weiler et al. | 455/67.13 |
| 6,047,165 A | 4/2000 | Wright et al. | |
| 6,104,914 A | 8/2000 | Wright et al. | |
| 6,108,523 A | 8/2000 | Wright et al. | |
| 6,148,179 A | 11/2000 | Wright et al. | |
| 6,154,636 A | 11/2000 | Wright et al. | |
| 6,154,637 A | 11/2000 | Wright et al. | |
| 6,160,998 A * | 12/2000 | Wright et al. | 455/66.1 |
| 6,163,681 A | 12/2000 | Wright et al. | |
| 6,167,238 A | 12/2000 | Wright | |
| 6,167,239 A | 12/2000 | Wright et al. | |
| 6,173,159 B1 * | 1/2001 | Wright et al. | 455/66.1 |
| 6,181,990 B1 | 1/2001 | Grabowsky et al. | |
| 6,275,172 B1 * | 8/2001 | Curtis et al. | 340/961 |
| 6,278,396 B1 * | 8/2001 | Tran | 342/29 |
| 6,353,734 B1 | 3/2002 | Wright et al. | |
| 6,385,513 B1 * | 5/2002 | Murray et al. | 701/14 |
| 6,438,468 B1 * | 8/2002 | Muxlow et al. | 701/3 |
| 6,459,411 B2 * | 10/2002 | Frazier et al. | 342/455 |
| 6,477,152 B1 | 11/2002 | Hiett | |
| 6,559,812 B1 | 5/2003 | McCarten et al. | |
| 6,671,589 B2 | 12/2003 | Holst et al. | |
| 6,760,778 B1 * | 7/2004 | Nelson et al. | 709/246 |
| 2003/0003872 A1 | 1/2003 | Brinkley et al. | |
| 2003/0093798 A1 * | 5/2003 | Rogerson | 725/75 |
| 2003/0148736 A1 * | 8/2003 | Wright et al. | 455/66 |
| 2004/0193732 A1 * | 9/2004 | Nelson et al. | 709/246 |

FOREIGN PATENT DOCUMENTS

| | | |
|---|---|---|
| WO | WO 99/31821 | 6/1999 |
| WO | WO 00/14987 | 3/2000 |

* cited by examiner

US 7,970,410 B2

METHOD AND APPARATUS FOR REMOTE INITIATION OF ARINC 615 DOWNLOADS

CROSS-REFERENCE TO RELATED APPLICATIONS

This application claims the benefit of U.S. Provisional Application No. 60/268,085, filed Feb. 13, 2001, which is incorporated herein by reference. This application is a continuation of U.S. patent application Ser. No. 10/075,032 filed on Feb. 12, 2002, which is incorporated herein by reference in its entirety. This application is also related to a commonly-assigned U.S. patent application of the same inventors entitled "METHODS AND APPARATUS FOR WIRELESS UPLOAD AND DOWNLOAD OF AIRCRAFT DATA", application Ser. No. 10/075,083, filed on even date herewith, which is also incorporated by reference in its entirety.

FIELD OF THE INVENTION

The present invention relates to communications systems, and more particularly to methods and apparatus to facilitate loading and acquisition of data relating to aircraft loadable computers.

BACKGROUND OF THE INVENTION

Software loadable avionics units (i.e., line replaceable units or LRUs) have the capability of downloading stored information onto a diskette. Present maintenance practices call for transferring aircraft data stored on certain LRUs onto floppy disk media utilizing a portable or PC-based ARINC 615-3 data loader. To transfer the stored aircraft data, a properly configured 3¼" floppy diskette is inserted into the data loader. In some cases, a permanently mounted airborne data loader may be used to perform this task for an aircraft installation. For example, on Boeing 737 aircraft, flight management computers (FMCs) are capable of downloading their stored faults onto floppy disks as described above. On Boeing 747 aircraft, a central maintenance computer is able to download its fault history database and an aircraft condition monitoring system (ACMS) is capable of downloading its stored serial stream aircraft parameters data, including up to eight selected channels of recorded smart access recorder data and triggered reports for the aircraft communications and reporting system (ACARS).

Two-way communication utilizing standard ARINC 615-3 protocol is needed for all LRUs that require periodic software updates. In at least one aircraft configuration, wires used for this communication are routed to a multiple deck rotary switch. The rotary switch is used by an operator to manually switch appropriate outputs from avionics boxes to an airborne data loader or to a connector for a portable data loader. The wiring passes from an electronics equipment (EE) bay to a centralized flight deck location. This configuration does not permit remote initiation of ARINC 615-3 communication because of the need for an operator to manually configure the communication path using the rotary switch. However, if such initiation were possible, a central maintenance function for the aircraft could be provided.

SUMMARY OF THE INVENTION

One configuration of the present invention therefore provides a method for remotely downloading data to a selected one of a plurality of avionics line replaceable units (LRUs) on an aircraft. The method includes transmitting a message wirelessly to a receiver on the aircraft identifying an LRU having data to be downloaded; selectively switching a communication path from the identified LRU to an aircraft data services link (ADSL) dependent upon the identified LRU; and wirelessly downloading data to the identified LRU utilizing the selectively switched communication path.

In another configuration of the present invention, an apparatus is provided for remotely downloading data to a selected one of a plurality of avionics line replaceable units (LRUs) on an aircraft. The apparatus is configured to receive a message wirelessly transmitted to the aircraft identifying an LRU having data to be downloaded; selectively switch a communication path from the identified LRU to an aircraft data services link (ADSL) dependent upon the identified LRU; and wirelessly download data to the identified LRU utilizing the selectively switched communication path.

In yet another configuration of the present invention, an apparatus is provided for downloading data to a selected one of a plurality of avionics line replaceable units (LRUs) onboard an aircraft. The apparatus includes a wireless radio transceiver; a communication management unit server responsive to the wireless radio transceiver; and a remotely controllable switch responsive to the communication management unit server to configure a data path between the wireless radio transceiver and a selected one of the LRUs for downloading of data.

Configurations of the present invention are useful in facilitating the loading and acquisition of data relating to aircraft loadable computers. In addition, certain configurations of the present invention also permit remote initialization of ARINC 615-3 communications, because an operator is not required to manually configure a communication path using a rotary switch onboard an aircraft. Thus, a central maintenance function for the aircraft can be provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
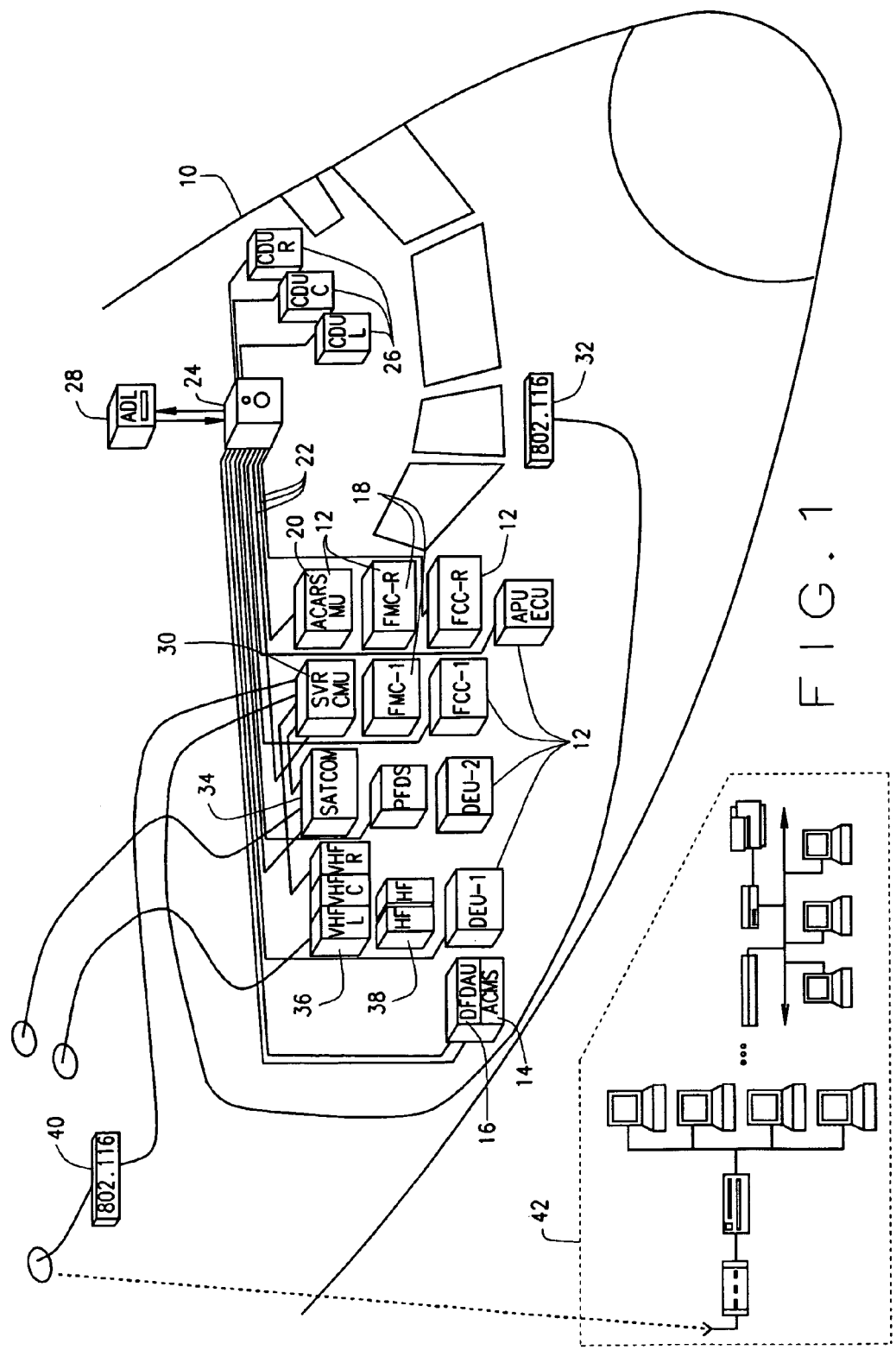
FIG. 1 is a pictorial block diagram of one configuration of the present invention, showing a representative installation on an aircraft.

In one configuration of the present invention and referring to FIG. 1, an aircraft 10 includes a plurality of LRUs 12, including, for example, an aircraft condition monitoring system (ACMS) 14, a digital flight data acquisition unit (DFDAU) 16, one or more flight maintenance computers (FMC) 18, and an aircraft communications and reporting system (ACARS) 20, one or more of which require two-way communication utilizing ARINC 615-3 protocol. Each LRU 12 communicates utilizing an ARINC 429-compatible link (i.e., communication path) 22. Because ARINC 429 compatible links cannot be shared, an electronic, remotely controllable switch 24 selectively switches communication paths 22. In one configuration, switch 24 is an aircraft data services link that also provides outputs that are used by control display units (CDUs) 26. An airborne data loader 28 provides local data access for downloading data to LRUs 12. Remote communication is provided via a link to a communication management unit server 30, which provides output for local radio communication (e.g., 802.11b spread spectrum transceiver 32), a satellite communication transceiver 34, VHF radio systems 36, and HF radio systems 38. Also provided in one configuration is an additional radio communication system 40, for example, an 802.11b spread spectrum transceiver, by which remote communication is possible from one or more ground access points 42. In one configuration, communication management unit server 30 is responsive to wireless transceivers 32, 34, 36, 38 and/or 40 for receiving data and selecting an LRU 12 to which to download data. (As used herein, the term "transceiver" is intended to be broadly interpreted as encompassing separate receiving and transmitting units as well as individual units having both transmitting and receiving functions.) Remotely controllable switch 24 is responsive to communication management unit server 30 to configure a data path between the wireless radio transceiver 32, 34, 36, 38 or 40 from which the selection of the LRU was obtained, for downloading of data.

Figure 2:
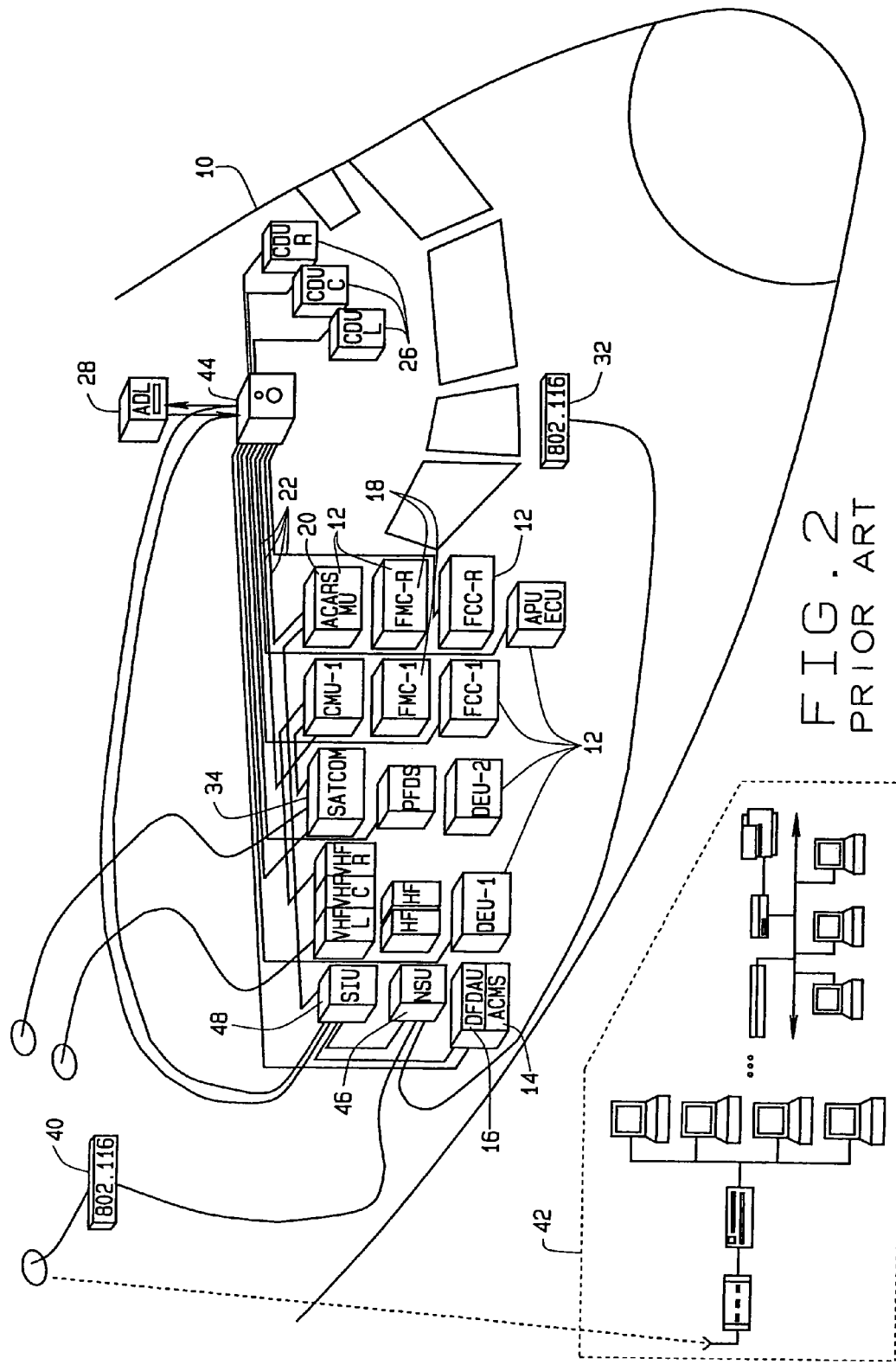
FIG. 2 is a pictorial block diagram of a prior art avionics system on an aircraft, provided for comparison with the pictorial block diagram of FIG. 1.

The configuration shown in FIG. 1 is compared to the prior art configuration of FIG. 2, which utilizes a rotary switch 44, which is manually operated to switch communication paths 22 from LRUs 12. Aircraft 10 requires only minimal rewiring to accommodate the configuration represented in FIG. 1. In addition, network server unit (NSU) 46 and server interface unit (SIU) 48 represented in the configuration of FIG. 2 are not required in the configuration represented in FIG. 1.

Figure 3:
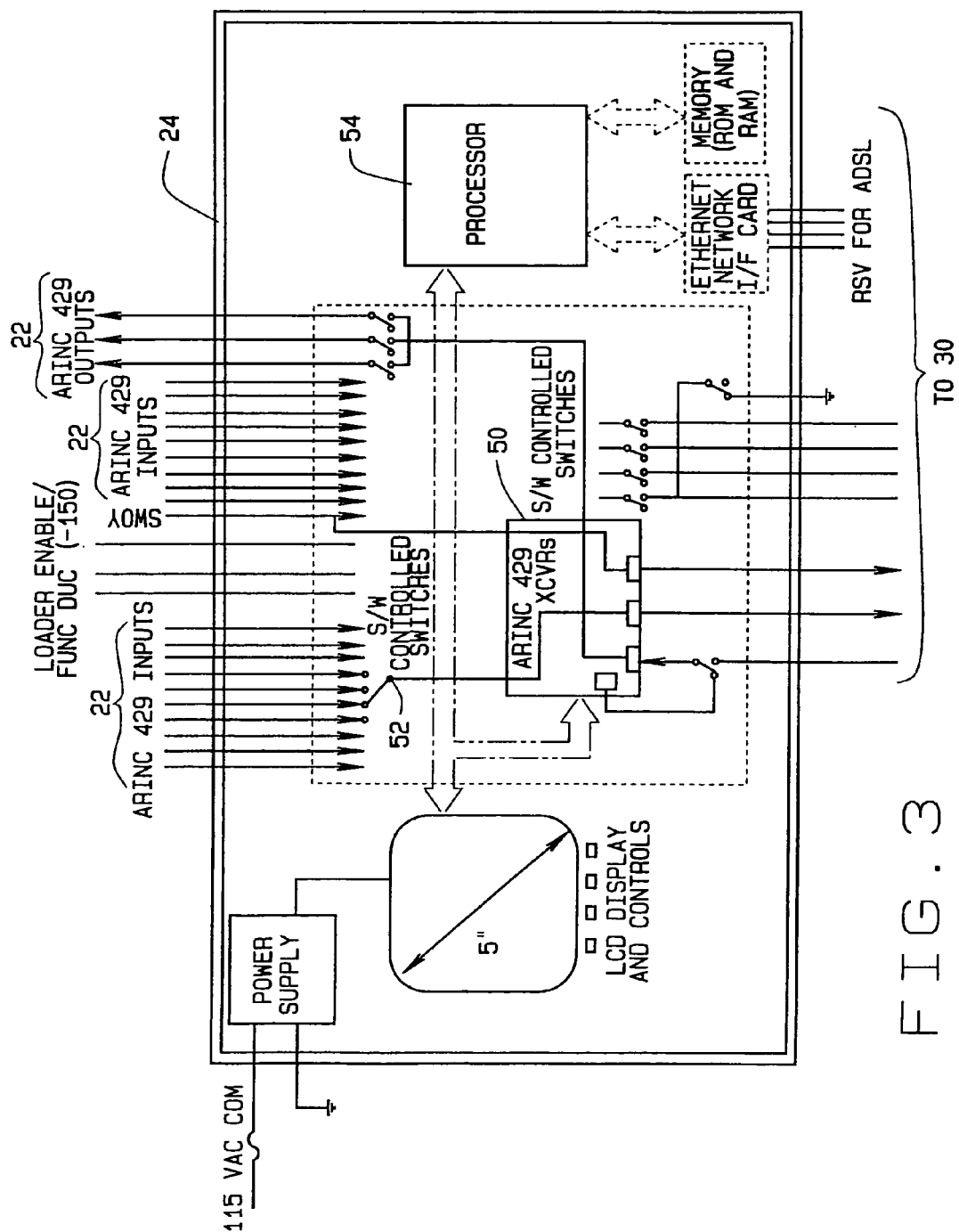
FIG. 3 is a block diagram of a remotely controllable switch suitable for use in the configuration of FIG. 1.

One configuration of suitable electronic, remotely controllable switch 24 is described in U.S. Provisional Application No. 60/268,085, filed Feb. 13, 2001, which is incorporated by reference herein. Referring to the block diagram of FIG. 3, a plurality of ARINC 429 inputs and outputs 22 are linked via an ARINC 429 transceivers module 50 through software controlled switches 52. Switches 52 are controlled by processor 54, which is responsive to communication management unit server 30 for controlling switches 52. Communication management unit server 30 relays instructions received by any of transceivers 32, 34, 36, 38 and/or 40. In this manner, communication paths 22 are selected so that ARINC 615 or ARINC 615-3 downloads can take place via transceivers 32, 34, 36, 38 and/or 40.

In one configuration of the present invention, a message is transmitted wirelessly to a transceiver (e.g., any of transceivers 32, 34, 36, and/or 38) identifying an LRU 12 to which a download is to be made. A communication path 22 is switched in response to this identification by remotely controlled switch 24 to provide a communication path, dependent upon the identified LRU 12, between the identified LRU and an aircraft data services link comprising switch 24 and communication management unit server 30. Data is then wirelessly downloaded via the transceiver receiving the original message identifying the LRU using the selectively switched communication path. In one configuration, the selectively switched communication path is an ARINC 429 communication path 22, and one of a plurality of such paths 22 is switched utilizing a software-controlled switch 52. In one configuration, the original message identifying the LRU and the downloaded data are sent using a spread spectrum communications link, such as one provided by 802.11b transceiver 32 or 40.

In combination with communication management unit server 30, switch 24 comprises an aircraft data services link (ADSL). ADSL performs a data acquisition function that utilizes existing storage features of existing aircraft LRUs 12 such as aircraft condition monitoring system (ACMS) 14, central maintenance computer (CMC) (not shown in the figures) and flight maintenance computer (FMC) 18, flight control computers (FCCs) 12, and auxiliary power unit/environmental control unit (APU ECU) 56 (shown in FIG. 1) and requests download data conforming to ARINC 615 data load formats. The ADSL server 30 application software provides the following operations that can be performed on the data:

1. On aircraft configuration management and storage. In one configuration, this functionality is synchronized with any configuration management and storage system in use on the ground, such as at ground access point 42.

2. Automatic routing via an appropriate medium, based on an operational program configuration (OPC) file that contains criteria for automated routing capability. The criteria include those that specify when and under what conditions to transfer data [from] to the aircraft [to] from a ground access point 42 via VHF radio 36, HF radio 38, SATCOM 34, or 802.11b transceiver 32 or 40. An OPC is treated as a software upload. Because avionics LRUs 12 can only be loaded when on the ground, the primary communications medium used to initiate changes to ADSL 24, 30 (or any other loadable LRU 12) OPC is a wireless spread spectrum 802.11b communication link. This link is coupled to the functionality of ADSL components 24, 30 such as an avionics gateway when avionics LRUs 12 require changes to their OPCs and to other types of loadable software. Loadable OPCs resident in ADSL server 30 support automated transfer of download data to aircraft 10 from ground access point 42, depending upon a variety of trigger conditions, for example, parking brake set. In one configuration, this automated transfer is handled by a download task management application distributed across the components of ADSL 24, 30, including any authorized network clients. An example of another task that is performed by the download task management application is the accumulation of historical records of all automated data download events.

3. Responses to operator-initiated requests from authenticated clients via any of the communication paths connected to ADSL 24, 30. Such requests may pertain to, but are not limited to, access to data from avionics LRUs 12 without manual operator intervention on the aircraft, synchronization tasks with associated ground network systems 42, backup and recovery initiation, and other network requests. The network clients may include one or more authorized users communicating via ADSL 24, 30 communications links, using cabin or flight deck mounted terminals, portable digital assistants (PDAs), wireless electronic flight bags (EFB) (which are not shown in the figures) or any number of ground terminals 42. To remotely initiate an ARINC 615 download, a header file (i.e., an ARINC 615 config.ldr file) intended for a target LRU 12 is configured for a download. This header file contains an appropriate system address label (SAL) for the targeted system. A connection to a specific computer i.e., LRU 12 must occur prior to activating a data download in those cases in which multiple computers having the same SAL are installed. A download task management application informs the operator that a connection to the appropriate LRU 12 has been established. The download task management application is resident on the ground based system or any other authorized network client and the avionics gateway.

The transfer of download operational software to aircraft data services link 24, 30 is similar to the uploading of data, except that a config.ldr header file indicates that a download is requested and the bulk of the data flow is to LRU 12 from ADSL server 30 application software.

It will thus be observed that configurations of the present invention provide direct control and access to store information on an aircraft subsystem while on the ground and within range of an 802.11b compatible access point. In at least one configuration, access is also provided via one or more other radio communication links, so that access can be provided even while airborne, in appropriate cases.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A data transfer system for an aircraft, said system comprising:
    a plurality of line replaceable units (LRUs) onboard the aircraft;
    a communications management unit onboard the aircraft;
    a plurality of wireless transceivers in communication with the communications management unit, each one of the wireless transceivers being operable to receive a signal containing LRU identification information from a remote signal source, and to transmit a message containing the LRU identification information to the communications management unit to identify one or more specific ones of the LRUs with which a respective one of said wireless transceivers is to communicate;
    an electronic switch in communication with the communications management unit and with each of the LRUs, the electronic switch responsive to the LRU identification information from the communications management unit indicating the specific one or more LRUs with which each said wireless transceiver is to communicate, and further operable to configure one or more communication paths in response to the LRU identification information from the communications management unit, through the communications management unit, between the transceivers and the one or more LRUs with which each respective said wireless transceiver is to communicate.

2. The system of claim 1, wherein the LRUs comprise at least one of an aircraft condition monitoring system, a digital flight data acquisition unit, a flight maintenance computer, and an aircraft communications and reporting system.

3. The system of claim 1, wherein the wireless transceivers comprise at least one of a spread spectrum transceiver, a satellite communication transceiver, a VHF radio transceiver and a HF radio transceiver.

4. The system of claim 1, wherein the one or more communication paths are ARINC 429 communication paths.

5. The system of claim 1, wherein the communications management unit comprises an operational program configuration (OPC) file that contains criteria for automatically transmitting the signals to the electronic switch indicating the selected communications paths to configure.

6. The system of claim 5, wherein the OPC is initiated upon the occurrence of a triggering condition.

7. The system of claim 6, wherein the triggering condition comprises setting a parking brake of the aircraft.

8. A method for remotely establishing a communications path between one or more of a plurality of line replaceable units (LRUs) and a transceiver onboard an aircraft, said method comprising:
    transmitting an LRU identification signal to the transceiver identifying which one of the LRUs the transceiver is to communicate with;
    communicating the LRU identification signal from the transceiver to a communications management unit onboard the aircraft;
    generating a path command signal at the communications management unit based on the LRU identification signal;
    communicating the path command signal to an electronic switch communicatively connected to each of the LRUs;
    configuring one or more communication paths, through the communications management unit, between the transceiver and the one or more LRUs with which the transceiver is to communicate, the path configured via the electronic switch in response to the path command signal.

9. The method of claim 8, wherein configuring the one or more communication paths comprises configuring one or more ARINC 429 communication paths.

10. The method of claim 8, further comprising automatically transmitting the path command signal to the electronic switch upon execution of an operational program configuration (OPC) file stored in the communications management unit.

11. The method of claim 10, wherein the OPC file is executed upon the occurrence of a triggering condition.

12. The method of claim 11, wherein the triggering condition comprises setting a parking brake of the aircraft.

13. The method of claim 8, wherein the LRUs comprise at least one of an aircraft condition monitoring system, a digital flight data acquisition unit, a flight maintenance computer, and an aircraft communications and reporting system.

14. The method of claim 8, wherein the wireless transceivers comprise at least one of a spread spectrum transceiver, a satellite communication transceiver, a VHF radio transceiver and a HF radio transceiver.

15. A data transfer system for an aircraft, said system comprising:
    a plurality of line replaceable units (LRUs) onboard the aircraft;
    a communications management unit onboard the aircraft, the communications management unit including an operational program configuration (OPC) file;
    a plurality of wireless transceivers in wireless communication with the communications management unit, each said wireless transceiver adapted to transmit a LRU identification message to the communications management unit identifying one or more of the LRUs with which the respective wireless transceiver is to communicate;
    an electronic switch communicatively connected to the communications management unit and each of the LRUs, the electronic switch responsive to path command signals, which are automatically transmitted from the communications management unit upon execution of the OPC file and in response to receiving the LRU identification message, to configure one or more ARINC 429 communication paths through the communications management unit and between the transceivers and the one or more LRUs with which each respective said wireless transceiver is to communicate, the path command signals indicating the one or more LRUs with which each respective said wireless transceiver is to communicate.

16. The system of claim 15, wherein the LRUs comprise at least one of an aircraft condition monitoring system, a digital flight data acquisition unit, a flight maintenance computer, and an aircraft communications and reporting system.

17. The system of claim 16, wherein the wireless transceivers comprise at least one of a spread spectrum transceiver, a satellite communication transceiver, a VHF radio transceiver and a HF radio transceiver.

18. The system of claim 15, wherein the OPC is initiated upon the occurrence of a triggering condition.

19. The system of claim 18, wherein the triggering condition comprises setting a parking brake of the aircraft.

* * * * *